United States Patent
Ferreira et al.

(10) Patent No.: US 11,572,807 B2
(45) Date of Patent: Feb. 7, 2023

(54) INTERNAL STRUCTURE OF A PRIMARY EXHAUST DUCT

(71) Applicant: Airbus Operations SAS, Toulouse (FR)

(72) Inventors: Julien Ferreira, Toulouse (FR); Vincent Trocellier, Castelginest (FR); Sandrine Andre, Paulhac (FR); Michael Kilkenny, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 148 days.

(21) Appl. No.: 16/743,077

(22) Filed: Jan. 15, 2020

(65) Prior Publication Data

US 2020/0232344 A1  Jul. 23, 2020

(30) Foreign Application Priority Data

Jan. 17, 2019 (FR) ..................... 1900412

(51) Int. Cl.
*F01D 25/30* (2006.01)
*F01N 13/08* (2010.01)
(Continued)

(52) U.S. Cl.
CPC ............. *F01D 25/30* (2013.01); *F01N 13/08* (2013.01); *F02K 1/80* (2013.01); *F02K 1/04* (2013.01); *F05B 2260/96* (2013.01)

(58) Field of Classification Search
CPC .......... F01D 25/30; F01D 25/28; F01D 25/24; F01D 25/243; F02K 1/80; F02K 1/04; F02K 1/827; F01N 13/08; F01N 13/082
See application file for complete search history.

(56) References Cited

U.S. PATENT DOCUMENTS

| 2,420,135 A | * | 5/1947 | Hennig | ................... F01D 25/26 432/223 |
| 2004/0076512 A1 | | 4/2004 | Lata Perez | |

(Continued)

FOREIGN PATENT DOCUMENTS

| EP | 1391597 A2 | 2/2004 |
| FR | 2916018 A1 | 11/2008 |
| FR | 2987079 A1 | 8/2013 |

OTHER PUBLICATIONS

French Search Report; priority document.

*Primary Examiner* — Thomas P Burke
(74) *Attorney, Agent, or Firm* — Greer, Burns & Crain, Ltd.

(57) ABSTRACT

An internal structure of a primary exhaust duct of a turbomachine, the internal structure comprising a primary wall comprising a surface of revolution about a longitudinal axis, allowing the air to pass through orifices and forming an internal surface of the primary exhaust duct, an interior skin comprising a surface of revolution about the longitudinal axis, arranged inside the primary wall, an upstream flange and a downstream flange which attach the interior skin to the interior of the primary wall, at least one separator which is attached to the interior skin and which extends from the interior skin towards the primary wall, the, or each, separator extends in a plane generally parallel to the longitudinal axis, between the two flanges, and the, or each, separator is not attached to the primary wall.

5 Claims, 3 Drawing Sheets

(51) Int. Cl.
  *F02K 1/80*  (2006.01)
  *F02K 1/04*  (2006.01)

(56) References Cited

U.S. PATENT DOCUMENTS

| | | | |
|---|---|---|---|
| 2007/0256889 A1* | 11/2007 | Yu | F02K 1/827 |
| | | | 181/214 |
| 2008/0110176 A1* | 5/2008 | Bunel | F01D 25/14 |
| | | | 60/766 |
| 2010/0205930 A1 | 8/2010 | Conete et al. | |
| 2015/0034412 A1* | 2/2015 | Mecuson | F01N 13/08 |
| | | | 181/256 |
| 2017/0335703 A1* | 11/2017 | White | F01D 25/162 |
| 2018/0274389 A1* | 9/2018 | Miller | F01D 25/18 |
| 2019/0040757 A1* | 2/2019 | Corser | F16J 15/0887 |

* cited by examiner

INTERNAL STRUCTURE OF A PRIMARY EXHAUST DUCT

CROSS-REFERENCES TO RELATED APPLICATIONS

This application claims the benefit of the French patent application No. 1900412 filed on Jan. 17, 2019, the entire disclosures of which are incorporated herein by way of reference.

FIELD OF THE INVENTION

The present invention relates to an internal structure of a primary exhaust duct of a turbomachine, to a turbomachine comprising an internal structure of this kind, to an aircraft comprising at least one turbomachine of this kind, and to a method for assembling an internal structure of this kind.

BACKGROUND OF THE INVENTION

A turbomachine conventionally comprises, from upstream to downstream, an air inlet through which the air enters the turbomachine, a motor which combusts the air and fuel, and an exhaust duct through which the burnt gases are evacuated.

A turbomachine of this kind generates noise during operation.

In order to attenuate some of this noise, the turbomachine is surrounded with a nacelle comprising noise attenuating means, such as honeycomb structures.

Low-frequency sounds (between 300 Hz and 1000 Hz), in particular those linked to combustion and emitted by the turbomachine during takeoff or landing, represent a significant source of noise for the environment and, in order to attenuate this noise, it is known to arrange devices for attenuating low-frequency sounds in the structure of the primary exhaust duct (also called "plug").

The primary exhaust duct is located in the extension of the motor and in front of the nozzle cone, and its exterior primary wall is in contact with the flow of burnt gas coming from the motor.

A device of this kind is effective, but it is necessary to find new embodiments.

SUMMARY OF THE INVENTION

The present invention has an object of proposing an internal structure of a primary exhaust duct of a turbomachine which comprises devices for attenuating low frequency noise and which is simple and easy to implement.

To that end, the invention proposes an internal structure of a primary exhaust duct of a turbomachine, the internal structure comprising:
- a primary wall comprising a surface of revolution about a longitudinal axis X, allowing the air to pass through orifices and forming an internal surface of the primary exhaust duct,
- an interior skin comprising a surface of revolution about the longitudinal axis X, arranged inside the primary wall,
- an upstream flange and a downstream flange which attach the interior skin to the interior of the primary wall,
- at least one separator which is attached to the interior skin and which extends from the interior skin towards the primary wall, the, or each, separator extends in a plane generally parallel to the longitudinal axis X, between the two flanges, and the, or each, separator is not attached to the primary wall.

The particular attachment of the interior wall facilitates the construction of the internal structure and the attenuation of the chosen frequencies.

According to one particular embodiment, the length of the, or each, separator is smaller than the distance between the primary wall and the interior skin.

According to another particular embodiment, the free end of each separator is in contact against the primary wall.

Advantageously, the, or each, separator comprises a base which is attached to the interior skin, and at least one tongue which is secured to the base and which extends between the interior skin and the primary wall.

Advantageously, there are at least two tongues. Two consecutive tongues are separated from one another by a slit, and the internal structure comprises an obturator which comprises a plinth which is attached to the base and tongues that are secured to the plinth and are offset parallel to the longitudinal axis X relative to the tongues of the separator and press against the tongues of the separator.

Advantageously, the free end of each tongue has a curvature.

Advantageously, the, or each, separator is made of a flexible material so as to allow articulation at the joint between the base and the, or each, tongue.

The invention also proposes a method for assembling an internal structure according to the preceding variant, where the assembly method comprises:
- a first provision step during which the primary wall is provided,
- a second provision step during which the downstream flange is provided,
- a first attachment step during which the downstream flange is attached to the primary wall,
- a third provision step during which the interior skin is provided,
- a fourth provision step during which at least one separator is provided,
- for each separator, a second attachment step during which each separator is attached to the interior skin,
- a stressing step during which each tongue of each separator is elastically deformed such that the distance between the center of the interior skin and the free end of each tongue is less than the radius of the primary wall,
- an introduction step during which the interior skin and the deformed tongues are introduced into the primary wall,
- a release step during which each tongue is released so as to recover its original shape and such that the free end of each tongue is positioned close to the primary wall,
- a third attachment step during which the interior skin is attached to the downstream flange,
- a fifth provision step during which the upstream flange is provided, and
- a fourth attachment step during which the upstream flange is attached to the primary wall and to the interior skin.

The invention also proposes a turbomachine comprising a primary exhaust duct bounded outwardly by a primary nozzle and inwardly by an internal structure according to one of the preceding variants.

The invention also proposes an aircraft comprising at least one turbomachine according to the preceding variant.

BRIEF DESCRIPTION OF THE DRAWINGS

The above-mentioned features of the invention, along with others, will become more clearly apparent on reading the following description of one exemplary embodiment, the description being given with reference to the appended drawings, in which.

DETAILED DESCRIPTION OF THE PREFERRED EMBODIMENTS

Figure 1:
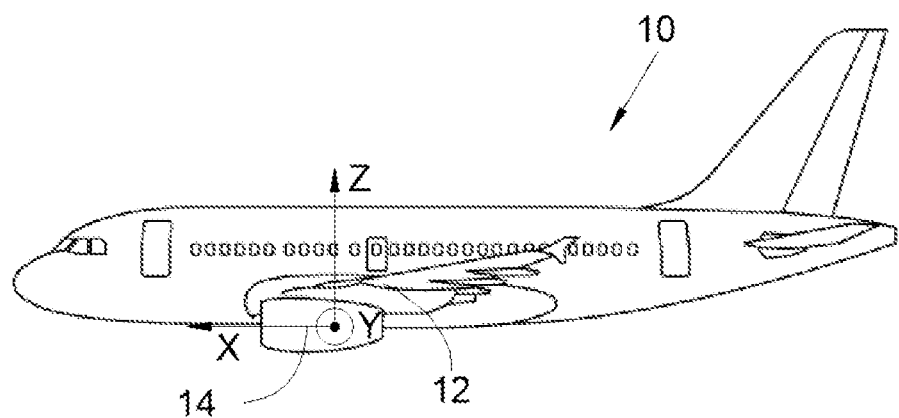
FIG. 1 is a side view of an aircraft according to the invention.

FIG. 1 shows an aircraft 10 which comprises a wing 12, beneath which there is attached a nacelle 14 which houses a turbomachine.

In the description that follows, and as is conventional, the X axis is the longitudinal axis of the turbomachine, with positive orientation in the direction of advance of the aircraft 10, this being also the longitudinal axis of the nacelle 14; the Y axis is the transverse axis which is horizontal when the aircraft 10 is on the ground; the Z axis is the vertical axis or vertical height when the aircraft 10 is on the ground; these three directions X, Y and Z are mutually orthogonal.

In the following description, the terms relating to a position refer to the direction of movement of the gases in the turbomachine, that is to say, from the front to the rear of the aircraft 10.

Figure 2:
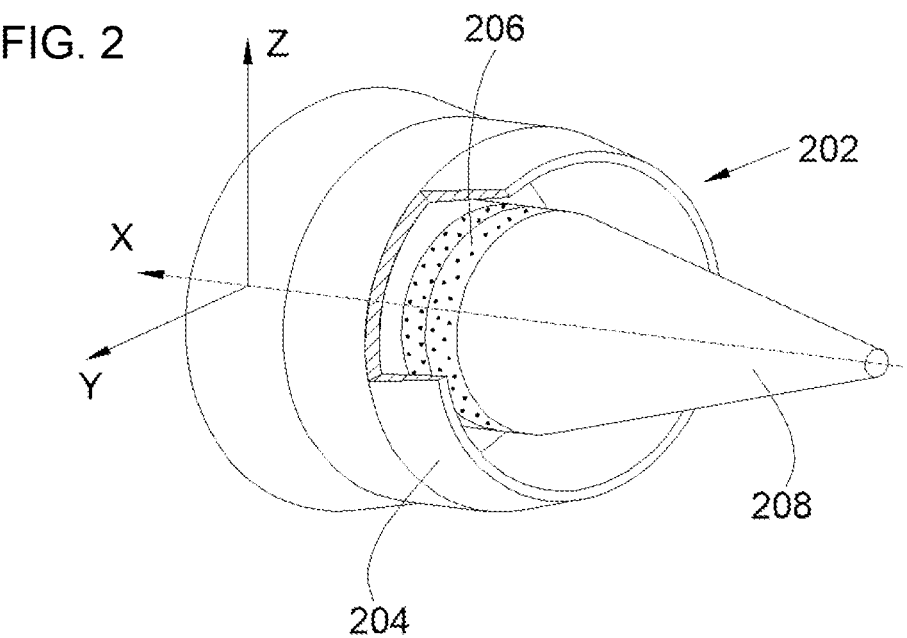
FIG. 2 is a perspective view of a primary exhaust duct.

FIG. 2 shows the rear part of the turbomachine which forms a primary exhaust duct 202 via which the gases burnt by the turbomachine escape and which is delimited outwardly by a primary nozzle 204 and inwardly by an internal structure 206 of the primary exhaust duct 202.

The primary exhaust duct 202, and its internal structure 206, have a general shape that comprises surfaces of revolution about the longitudinal axis X of the turbomachine.

A nozzle cone 208 is attached to the rear of the internal structure 206.

Figure 3:
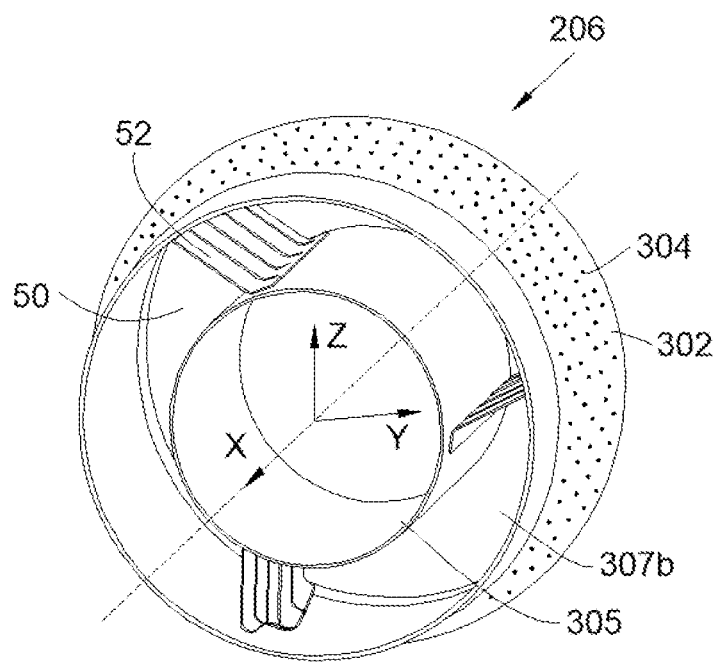
FIG. 3 is a perspective view of an internal structure of a primary exhaust duct according to the invention.
Figure 4:
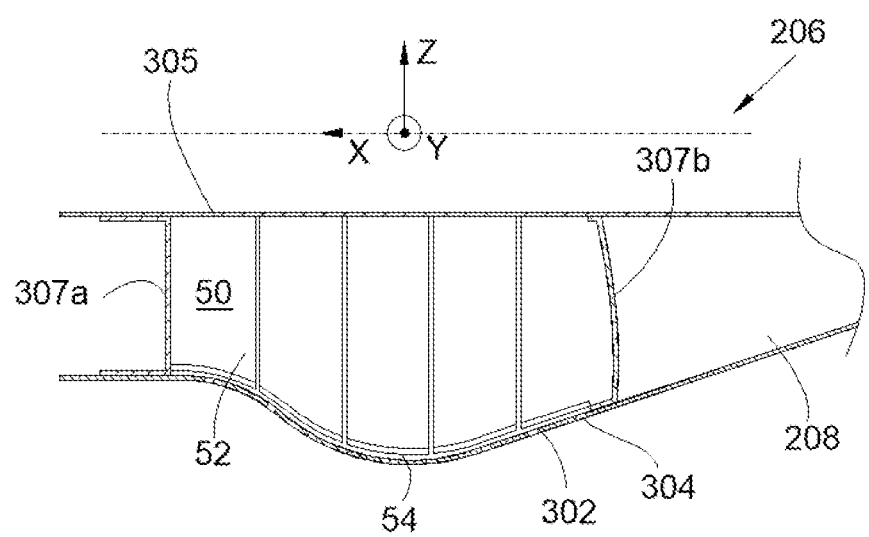
FIG. 4 is a side view in section through an axial plane of the internal structure of FIG. 3.

FIG. 3 shows a front perspective view of the internal structure 206, and FIG. 4 is a side view in section of the internal structure 206 and of the cone 208.

The internal structure 206 comprises a primary wall 302 in which are created holes 304 distributed over the surface of the primary wall 302. The primary wall 302 forms the outer surface of the internal structure 206, that is to say that it forms the internal surface of the primary exhaust duct 202.

The internal structure 206 comprises an interior skin 305. The primary wall 302 and the interior skin 305 each comprises a surface of revolution about the longitudinal axis X which, in this example, is cylindrical overall and the interior skin 305 is arranged inside the primary wall 302 so as to constitute an assembly of two coaxial surfaces.

The interior skin 305 is attached to the primary wall 302 by means of an upstream flange 307a and a downstream flange 307b which are attached between the primary wall 302 and the interior skin 305. The upstream flange 307a is not shown in FIG. 3 so as to make it possible to visualize the interior of the internal structure 206. Each flange 307a-b is attached using any appropriate means such as screws, welding, etc.

The volume 50 between the interior skin 305 and the primary wall 302 forms a box which constitutes a Helmholtz resonator.

In order to divide the volume 50 into multiple sub-volumes, the internal structure 206 comprises at least one separator 52 which is attached to the interior skin 305 and which extends from the interior skin 305 towards the primary wall 302. The, or each, separator 52 extends in a plane generally parallel to the longitudinal axis X, between the two flanges 307a-b.

The separator 52 is not attached to the primary wall 302 so as to not stress the assembly in the event of deformation of the internal structure 206.

Each separator 52 is attached to the interior skin 305 by any appropriate means such as bolts, spot welding, etc.

According to one particular embodiment, in order to avoid contact between the separator 52 and the primary wall 302, the length of the separator 52 is smaller than the distance between the primary wall 302 and the interior skin 305. The gap 54 between the free end of each tongue 506 and the primary wall 302 is, for example, of the order of 2 mm.

According to another particular embodiment, the free end of each separator 52 is in contact against the primary wall 302, that is to say, without play. This embodiment serves to make each cavity leak-tight and limit the vibrations of the separators 52.

Figure 5:
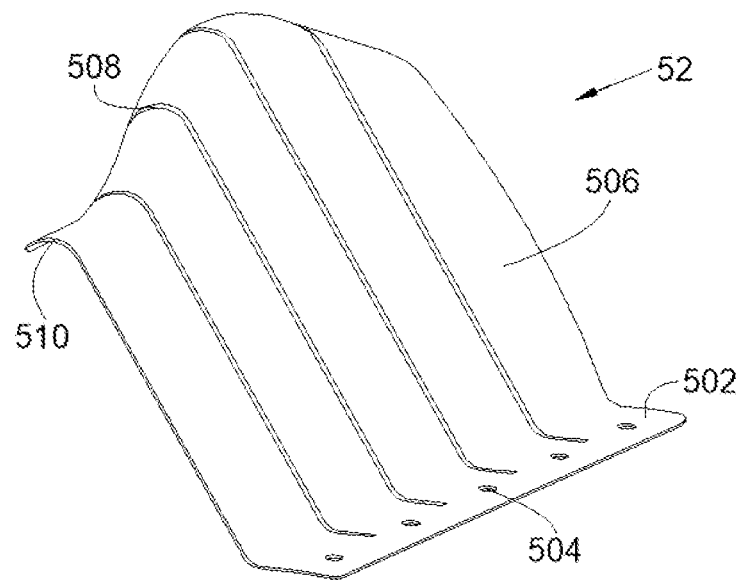
FIG. 5 is a perspective view of an example of a separator implemented in the internal structure according to the invention.

FIG. 5 shows an example of one embodiment of a separator 52. The separator 52 comprises a base 502 which is attached to the interior skin 305. In the embodiment shown, the base 502 has bores 504 to allow attachment by means of bolts.

The separator 52 comprises at least one tongue 506 which is secured to the base 502 and which extends through the volume 50 between the interior skin 305 and the primary wall 302.

The separator 52 is preferably made of a flexible material so as to allow articulation at the joint between the base 502 and each tongue 506, such as, for example, in a thin metal plate.

The flexibility of each tongue 506 permits adaptation in the event of deformation of the internal structure 206, in particular in the event of thermal expansion of the interior skin 305. The flexibility also permits a particular assembly described below.

The use of multiple tongues 506 makes it possible to easily adapt the shape of the separator 52 to the shape of the primary wall 302.

In order to limit the wear that the free edge could cause on the primary wall 302 or the separator 52, the free end of each tongue 506 has a curvature 510. It is also possible to replace or complement this curvature 510 with a sliding coating (Teflon®) or a wear pad.

When there are at least two consecutive tongues 506, these are separated from one another by a slit 508. Depending on requirements, it is possible to close these slits 508, by superposing an obturator which comprises a plinth which is attached to the base 502 and tongues that are secured to the plinth and are offset parallel to the longitudinal axis X relative to the tongues 506 of the separator 52 and press against the tongues 506 of the separator 52.

The obturator also has flexibility between the plinth and the tongues.

According to one particular embodiment, the obturator is a system identical to the separator 52 described above, but whose tongues 506 are offset with respect to the tongues 506 of the separator 52 to which it is attached.

Figure 6:
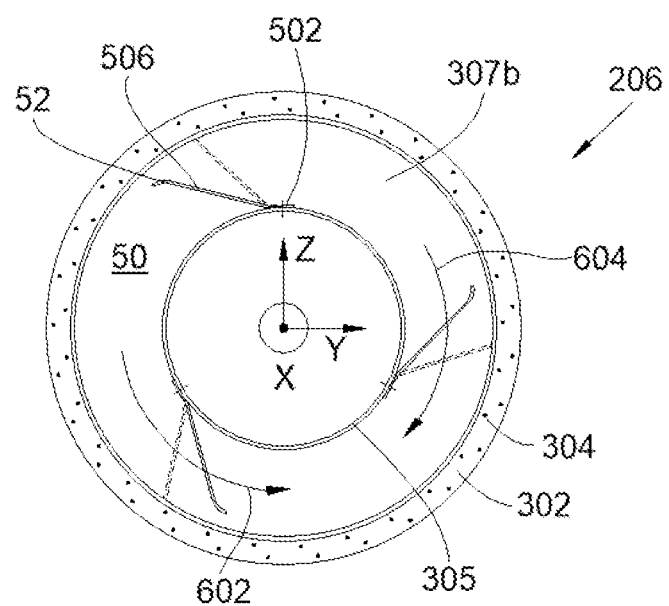
FIG. 6 is a front view of the internal structure according to the invention during a step of assembling same.

FIG. 6 shows a step of assembling the internal structure 206 when the separators 52 and any obturators are flexible.

An example of an assembly method comprises:
a first provision step during which the primary wall 302 is provided,
a second provision step during which the downstream flange 307b is provided,
a first attachment step during which the downstream flange 307b is attached to the primary wall 302,
a third provision step during which the interior skin 305 is provided,
a fourth provision step during which at least one separator 52 is provided,
for each separator 52, a second attachment step during which each separator 52 is attached to the interior skin 305,
a stressing step during which each tongue 506 of each separator 52 is elastically deformed such that the distance between the center of the interior skin 305 and the free end of each tongue 506 is less than the radius of the primary wall 302,
an introduction step during which the interior skin 305 and the deformed tongues 506 are introduced into the primary wall 302,
a release step during which each tongue 506 is released so as to recover its original shape and such that the free end of each tongue 506 is positioned close to the primary wall 302,
a third attachment step during which the interior skin 305 is attached to the downstream flange 307b,
a fifth provision step during which the upstream flange 307a is provided, and
a fourth attachment step during which the upstream flange 307a is attached to the primary wall 302 and to the interior skin 305.

FIG. 6 shows the stressing step during which each tongue 506 is elastically deformed so as to reduce the space that it takes up around the interior skin 305. Stressing comprises flattening each tongue 506 (arrow 602). This makes it possible to introduce the interior skin 305 and the separators 52 through a diameter of the primary wall 302 which is smaller than the diameter of the non-stressed separators 52.

During the release step, each tongue 506 straightens up (arrow 604), and the dash-dotted lines represent the tongues 506 which have straightened up inside the primary wall 302.

When present, the obturators are provided and attached between the second attachment step and the stressing step.

Although the interior skin 305 is described as comprising a single piece, it is possible to create it by attaching multiple panels which it might be possible to dismantle in order to facilitate inspection.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An internal structure of a primary exhaust duct of a turbomachine, said internal structure comprising:
a primary wall comprising a surface of revolution about a longitudinal axis, allowing air to pass through orifices and forming an internal surface of the primary exhaust duct,
an interior skin comprising a surface of revolution about the longitudinal axis, arranged inside the primary wall,
a volume between interior skin and the primary wall,
an upstream flange and a downstream flange which attach the interior skin to an interior of the primary wall,
a plurality of separators, each separator is attached to the interior skin and which extends from the interior skin towards the primary wall, each separator extending in a plane generally parallel to the longitudinal axis, the plurality of separators extending from the upstream flange to the downstream flange, and each separator being unattached to the primary wall,
wherein the volume is separated into sub-volumes defined by the upstream flange, the downstream flange, and the plurality of separators,
wherein each separator comprises a base which is attached to the interior skin, and at least one tongue which is secured to the base and which extends between the interior skin and the primary wall,
wherein each separator is made of a flexible material so as to allow articulation at a joint between the base and the at least one tongue,
wherein a free end of each separator is in contact against the primary wall.

2. The internal structure according to claim 1, wherein a free end of each tongue has a curvature.

3. A method for assembling the internal structure according to claim 1, where said assembly method comprises:
a first providing step during which the primary wall is provided,
a second providing step during which the downstream flange is provided,
a first attaching step during which the downstream flange is attached to the primary wall,
a third providing step during which the interior skin is provided,
a fourth providing step during which the plurality of separators is provided,
for each separator, a second attaching step during which each separator is attached to the interior skin,
a stressing step during which each tongue of each separator is elastically deformed such that a distance between a center of the interior skin and the free end of each tongue is less than a radius of the primary wall,
an introducing step during which the interior skin and the elastically deformed tongues are introduced into the primary wall,
a releasing step during which each tongue is released so as to recover the original shape of the tongue and such that a free end of each tongue is positioned close to the primary wall,
a third attaching step during which the interior skin is attached to the downstream flange,
a fifth providing step during which the upstream flange is provided, and
a fourth attaching step during which the upstream flange is attached to the primary wall and to the interior skin.

4. A turbomachine comprising a primary exhaust duct bounded outwardly by a primary nozzle and inwardly by the internal structure according to claim 1.

5. An aircraft comprising at least one turbomachine according to claim 4.

\* \* \* \* \*